United States Patent

[11] 3,629,917

[72] Inventor John A. Cupler, II
 10 Cupler Drive, La Vale, Cumberland, Md. 21502
[21] Appl. No. 851,715
[22] Filed Aug. 20, 1969
[45] Patented Dec. 28, 1971
 Continuation-in-part of application Ser. No. 715,711, Mar. 25, 1968, now Patent No. 3,478,419. This application Aug. 20, 1969, Ser. No. 851,715

[54] MACHINING CENTER EMPLOYING NON-CAPTIVE TOOLS WITH RELEASABLE HOLD-DOWN ATTACHMENT
 6 Claims, 3 Drawing Figs.
[52] U.S. Cl...................................................... 29/26, 29/568
[51] Int. Cl...................................................... B23q 3/157
[50] Field of Search.......................................... 29/568, 26; 77/22

[56] References Cited
 UNITED STATES PATENTS
 81,655 9/1868 Long............................ 77/22 X
 931,119 8/1909 Hocking....................... 77/22
 1,133,243 3/1915 Hill............................... 77/22
 1,452,920 4/1923 McLellan..................... 77/22
 3,478,419 11/1969 Cupler......................... 29/568

Primary Examiner—Andrew R. Juhasz
Assistant Examiner—Z. R. Bilinsky
Attorney—Colton & Stone ABSTRACT: The disclosure relates to a method and apparatus for rigidly restraining a noncaptive tool against transverse bodily movement during that time the tool is actually working.

A noncaptive tool is herein defined as one which may undergo bodily movement, transversely of its own axis, relative to both the tool bearing structure which accommodates the tool in working position and a tool support structure which supports the tool in a nonworking position adjacent the bearing structure. The noncaptive tool is unrestrained against the aforesaid bodily movement except during that time the tool is actually working and, while working, a rigid restraint is imposed in addition to a flexible restraint imposed by the tool driving means.

The foregoing is accomplished by the mounting of a first open bearing structure upon a tool placement rack for movement therewith during its tool interchange cycle into and out of coacting relationship with a second, fixed open bearing structure. The two open bearing structures coact in one position of the tool placement rack to provide a composite rigid bearing structure rigidly restraining transverse bodily movement of the tool journaled therein and in all other positions of the tool placement rack are maintained out of the aforesaid coacting relationship.

INVENTOR
JOHN A. CUPLER, II

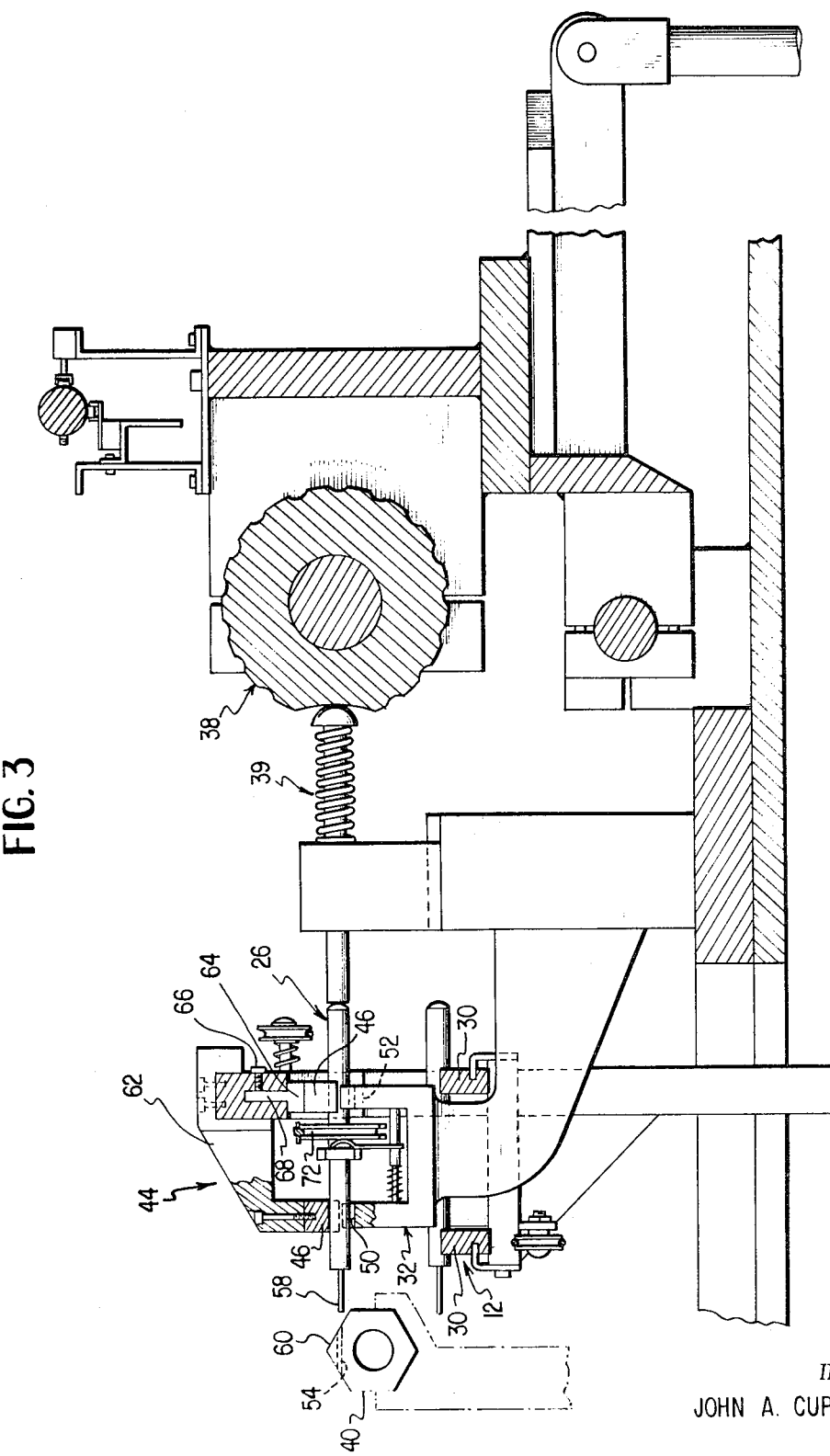

MACHINE CENTER EMPLOYING NON-CAPTIVE TOOLS WITH RELEASABLE HOLD-DOWN ATTACHMENT

This is a continuation-in-part of copending application Ser. No. 715,711 filed Mar. 25, 1968, now U.S. Pat. No. 3,478,419.

The invention relates to automatic tool changers of the type employing noncaptive tools.

Automatic tool changers employing noncaptive tools were introduced by the disclosure in the aforesaid copending application wherein a plurality of noncaptive tools are supported in nonworking position adjacent an open bearing structure and may be selectively interchanged with a noncaptive tool positioned in the open bearing. That restraint previously imposed on the working tool, while the same is actually working, has been a flexible restraint resisting bodily transverse movement of the working tool in a direction away from its bearing support, i.e., in the opening direction of the bearing which, in the case of a horizontally arranged tool changer employing V-bearings such as illustrated in the aforesaid copending application, would be in an upward direction with respect to at least a portion of one V-bearing. This flexible restraint is more than adequate under normal machining conditions however under certain conditions it is desirable to provide a more rigid restraint. Exemplary of such conditions are the drilling of work pieces presenting a work surface which is angularly inclined relative to the tool infeed axis and certain other machining operations, such as milling, where the forces imposed by the workpiece on the tool have a relatively large reactive component which is not coincident with the axis of tool rotation and/or the tool infeed axis.

Additionally, in certain machining operations it is desirable to employ a positive rather than friction drive to rotate the working tool the use of which positive drive becomes more desirable as the mass of the tools is increased beyond those masses where slippage in the friction drive of the type illustrated in the aforesaid copending application is of little if any consequence.

It is, accordingly, a primary object of the invention to provide means for insuring that a working tool utilized in conjunction with a tool changer of the type disclosed in the aforesaid copending application will be positively and rigidly restrained against bodily movement transversely of its working axis of rotation irrespective of the magnitude or direction of the reactive thrusts imparted thereto by a workpiece. It is a further object of the invention to provide a positive drive for the working tool which, together with the aforementioned rigid restraint, provides for a greater flexibility in those machining operations than may be performed with a tool changer incorporating noncaptive tools.

The foregoing objects are achieved by the provision of a second open bearing which coacts with each of the open bearings illustrated in the aforesaid copending application and more fully described hereinafter, to sequentially, rigidly restrain and release a tool as an incident of an automatic tool change cycle. A timing belt, sprocket chain or other flexible positive drive means insures that sufficient drive torque is transmitted to the working tool to perform its intended machining operation.

In the drawings:

FIG. 3 is a partial sectional view of the tool changer illustrated in the aforesaid copending application and showing the restraining or holddown attachment in elevation with parts in section.

Figure 1:
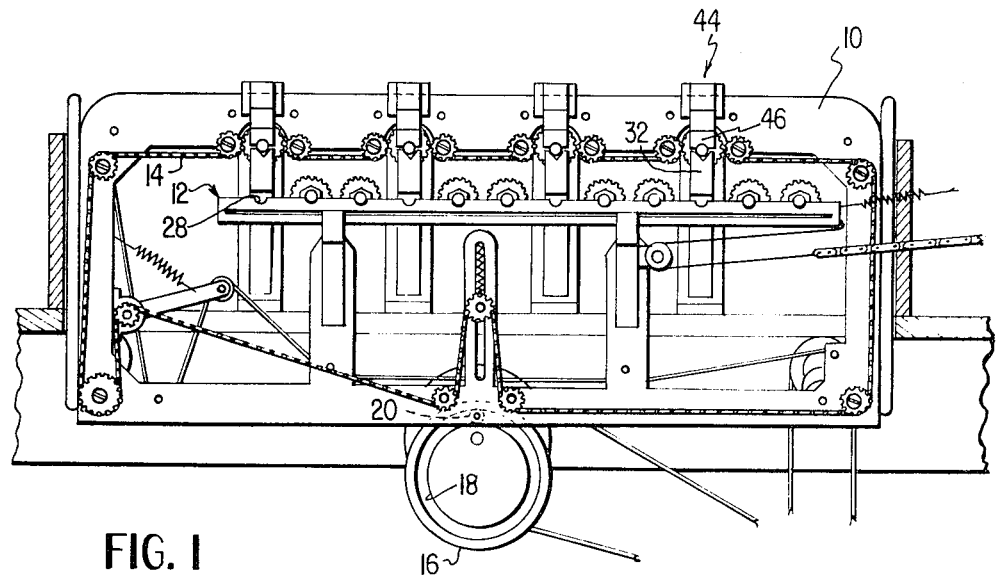
FIG. 1 is a fragmentary front elevation illustrating the drill placement rack and horizontal support rack of the automatic tool changer described in copending application Ser. No. 715,711 and depicting the same in position for a machining operation with the working tools rigidly restrained against transverse bodily movement, in accordance with the present invention.

In FIG. 1 is illustrated, in front elevation, a vertically moveable drill placement rack 10 mounting thereon a horizontal support rack 12 for horizontal movement relative thereto and a recirculating flexible tool driving element 14 herein illustrated as a timing belt. The manner in which racks 10 and 12 undergo their precise cyclic movements and the drive means therefor are clearly disclosed in the aforesaid copending application and further reference may be had thereto for details of operations incidental to the present invention. Suffice to say that racks 10 and 12 are vertically shiftable between the lower and upper positions shown in FIGS. 1 and 2, respectively, by a cam 16 having a cam groove 18 coacting with a roller 20 journaled on the lower edge of rack 10. Horizontal support rack 12 undergoes its horizontal movement under the influence of adjusting elements 22, 24.

A plurality of noncaptive tools 26 are supported adjacent opposite ends of their spindles in spaced aligned pairs of recesses 28 formed in the opposite sides 30 of the generally rectangular framework of support rack 12 as best shown in FIG. 3. As will be apparent from an inspection of the latter Figure, the sides 30 of rack 12 span conventional open V-bearings 32 where tools 26 are supported to perform machining operations.

Figure 2:
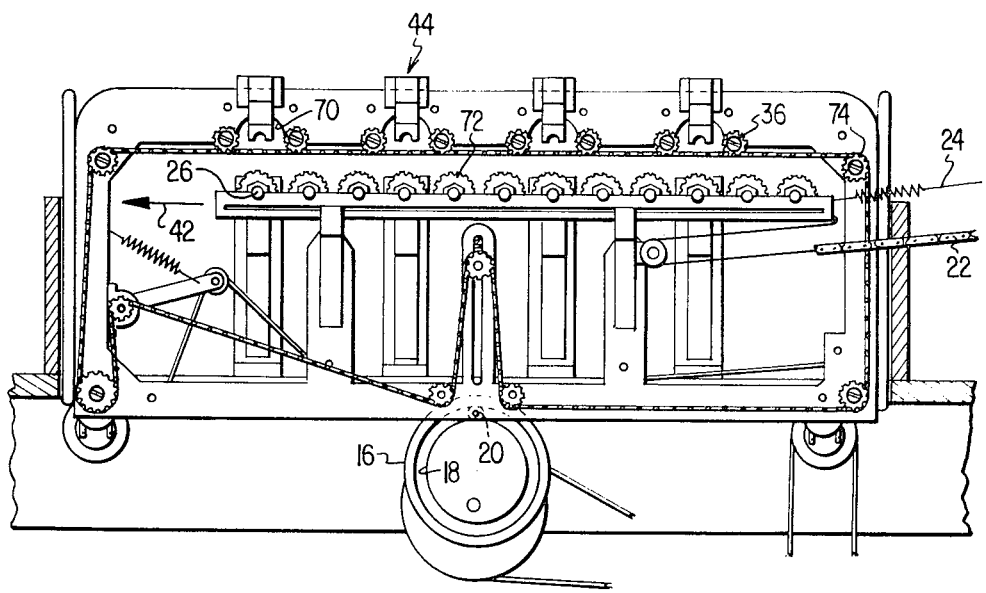
FIG. 2 is a view similar to FIG. 1 illustrating the placement and support racks positioned for a tool changing operation.

Considering, first, the placement rack position of FIG. 2 wherein the 12 tools are supported in their respective recesses 28 on rack 12; the placement rack is next shifted downwardly to the position of FIG. 1 whereupon those tools 26 overlying the four V-bearings 32 are deposited thereupon and driving element 14 is trained around the respective tool driving spindle pulleys 34 by idlers 36 to rotate the tools. Thereafter rotation and translation of cone cam 38, in conjunction with appropriately positioned cam follower infeed elements 39, effects advancing reciprocating infeed of the tools into a workpiece such as the hex nut 40 illustrated in FIG. 3 which may be supported at its work station in any desired manner such as by a clamping or vacuum chuck.

Following the completion of a machining operation by the tools positioned in the open V-bearings shown in FIG. 1; the infeed mechanism retracts, the drill placement rack 10 is shifted to the upper position shown in FIG. 2 thereby lifting from the V-bearings those four tools which have just completed their machining operations and the horizontal placement rack 12 is shifted in the direction indicated by the solid arrow 42 to bring four more tools into position over the open bearings whereupon the placement rack is lowered to deposit the four new tools in the bearings.

All of the foregoing is fully described in the aforesaid copending application. The improvements herein disclosed reside in the addition of the holddown attachments 44 including open bearings 46 and the positive driving element 14.

As will be apparent from FIG. 3, V-bearings 32, each, include fore and aft spaced V's 50, 52 which support the tool spindle for rotation and/or reciprocation. There are some machining applications wherein substantial transverse reactive components are imparted to the tools. Exemplary of such applications are certain milling and grinding operations as well as certain portions of drilling operations. Thus in the drilling of locking wire holes 54 in hex nuts 40 the initial contact of drill point 58 with inclined nut surface 60 imparts a substantial transverse reactive component to tool 26 which would tend to "walk" along the incline and lift bodily away from front v 50. The rigid securement of holddown attachments 44 to the drill placement rack in position to coact with V-bearings 32 provide a rigid restraint for tools 26 when they are actually working and, yet, move upwardly with the drill placement rack to free the tools for an interchange operation precisely in accordance with the operation described in the aforesaid copending application.

Each holddown attachment comprises body portions 62, 64 rigidly secured adjacent the upper edge of placement rack 10 in vertical alignment with V-bearings 32 and terminating in downwardly open plain bearings 46 herein illustrated as partial or semicylindrical bearings whose placement is such that in the lower drill placement rack position the two downwardly open bearings 46 engage the upper peripheral portion of each working tool spindle above the corresponding upwardly open V-bearing portion 50, 52 thus coacting therewith to restrain the working tool against transverse bodily movement.

Upper body portion 62 embraces the upper edge of the placement rack and is secured thereto by machine screws or the like. A setscrew 66, is employed to lock trunnion 68 of lower body portion 64 in a blind bore formed in the upper surface of placement rack recess 70. It will, of course, be obvious that the holddown attachment comprising body portions 62, 64 and open bearings 46 could be a single composite unit with the composite portions being united by machine screws or the like. Each open bearing 46 is formed from a separate piece of bearing material which is releasably secured to its respective body portion by machine screws or the like. Shims or similar spacing devices may be used, as necessary, between open bearings 46 and body portions 62, 64 to accommodate different diameter tool spindles.

Integral tool spindle pulleys 72 and the various idler pulleys 74 and 36 are formed with notches to cooperate with timing belt 14 to insure the transmission of a positive drive to the tools.

As will be obvious, the tool change cycle takes place in the manner previously described and as the drill placement rack, carrying the holddown attachment, reaches its lower drill position shown in FIG. 1, the cylindrical partial bearing portions 46 coact with V's 50, 52 to clamp and journal each of the working tool spindles.

I claim:

1. A tool changer including a work station and tool infeed means spaced therefrom, bearing means positioned intermediate said work station and tool infeed means to support a tool in machining position for simultaneous rotary and reciprocating movement relative thereto, tool support means mounted for movement relative to said bearing means, means for bodily interchanging tools therebetween, tool restraining means moveable into and out of coacting relationship with said bearing means for imposing and releasing a rigid restraint against transverse bodily movement of a tool supported by said bearing means, drive means for imparting said movement to said tool support means, and drive means for rotating and reciprocating said tool.

2. The tool changer of claim 1 wherein said last named drive means includes a positive driving element for rotating said tool.

3. The tool changer of claim 1 wherein said bearing means comprises at least one open bearing.

4. The tool changer of claim 3 wherein said tool restraining means comprise at least one open bearing coacting with said first named open bearing for imposing and releasing said rigid restraint.

5. The tool changer of claim 4 wherein said tool restraining means is carried by said means for bodily interchanging tools.

6. Apparatus for interchanging a plurality of noncaptive spindle mounted tools between working and nonworking positions and temporarily captivating a tool in working position, comprising; an open spindle bearing, a tool support rack including plural pairs of spaced aligned tool spindle supporting recesses opening in the same direction as said spindle bearing for supporting a plurality of spindle mounted tools thereon, an open spindle retainer aligned with and opening in the direction of said spindle bearing, and means mounting said spindle retainer and tool support rack for movement relative to said spindle bearing for interchanging tools between said bearing and said support rack and imposing a rigid restraint on the tool in said spindle bearing when said last named means is in one position and releasing said restraint at all other positions of said last named means.

* * * * *